Feb. 13, 1962   F. T. ROBERTS ET AL   3,021,245
METHOD OF MAKING A REINFORCED CORRUGATED HOSE
Filed June 29, 1956   4 Sheets-Sheet 1

INVENTORS
Fred T. Roberts
Robert E. Roberts
BY
Johnson and Kline
ATTORNEYS

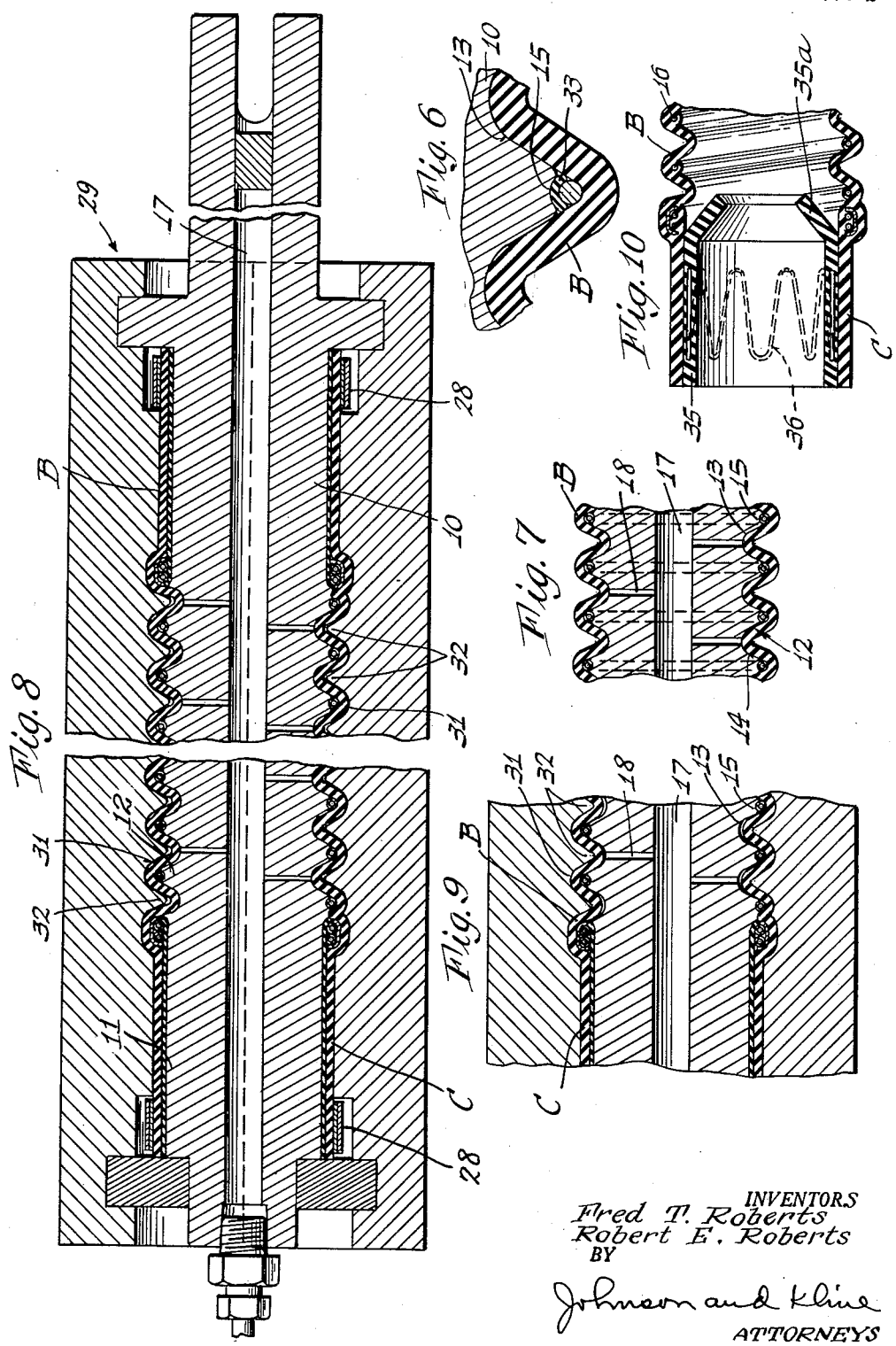

Feb. 13, 1962 F. T. ROBERTS ET AL 3,021,245
METHOD OF MAKING A REINFORCED CORRUGATED HOSE
Filed June 29, 1956 4 Sheets-Sheet 3
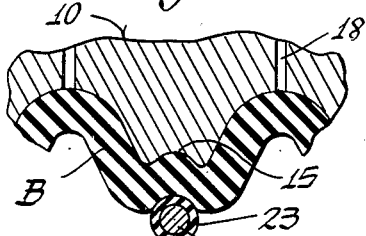
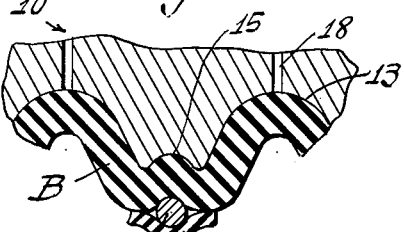
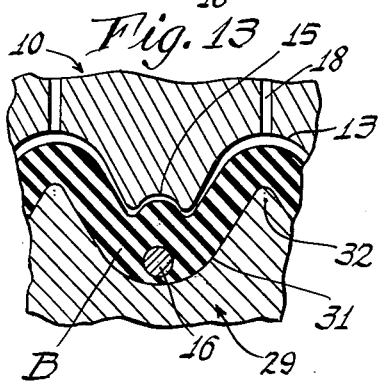
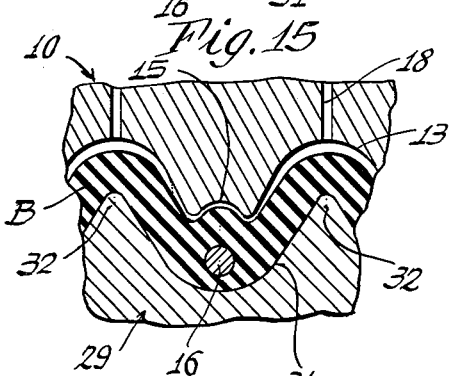
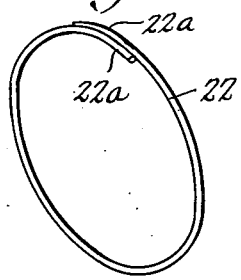
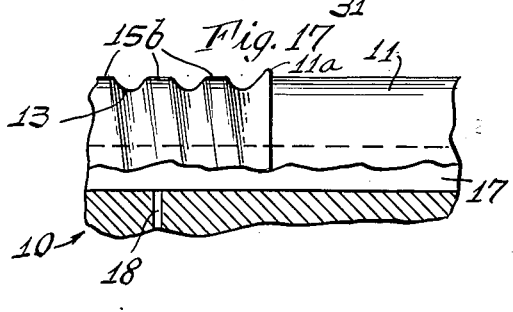
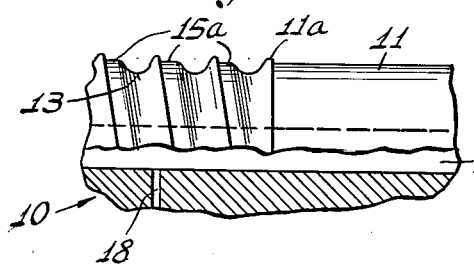
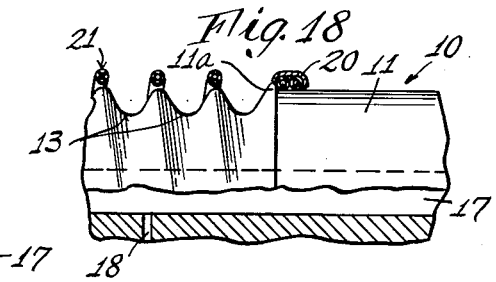
INVENTORS
Fred T. Roberts
Robert E. Roberts
BY
Johnson and Kline
ATTORNEYS Feb. 13, 1962  F. T. ROBERTS ET AL  3,021,245
METHOD OF MAKING A REINFORCED CORRUGATED HOSE
Filed June 29, 1956  4 Sheets-Sheet 4
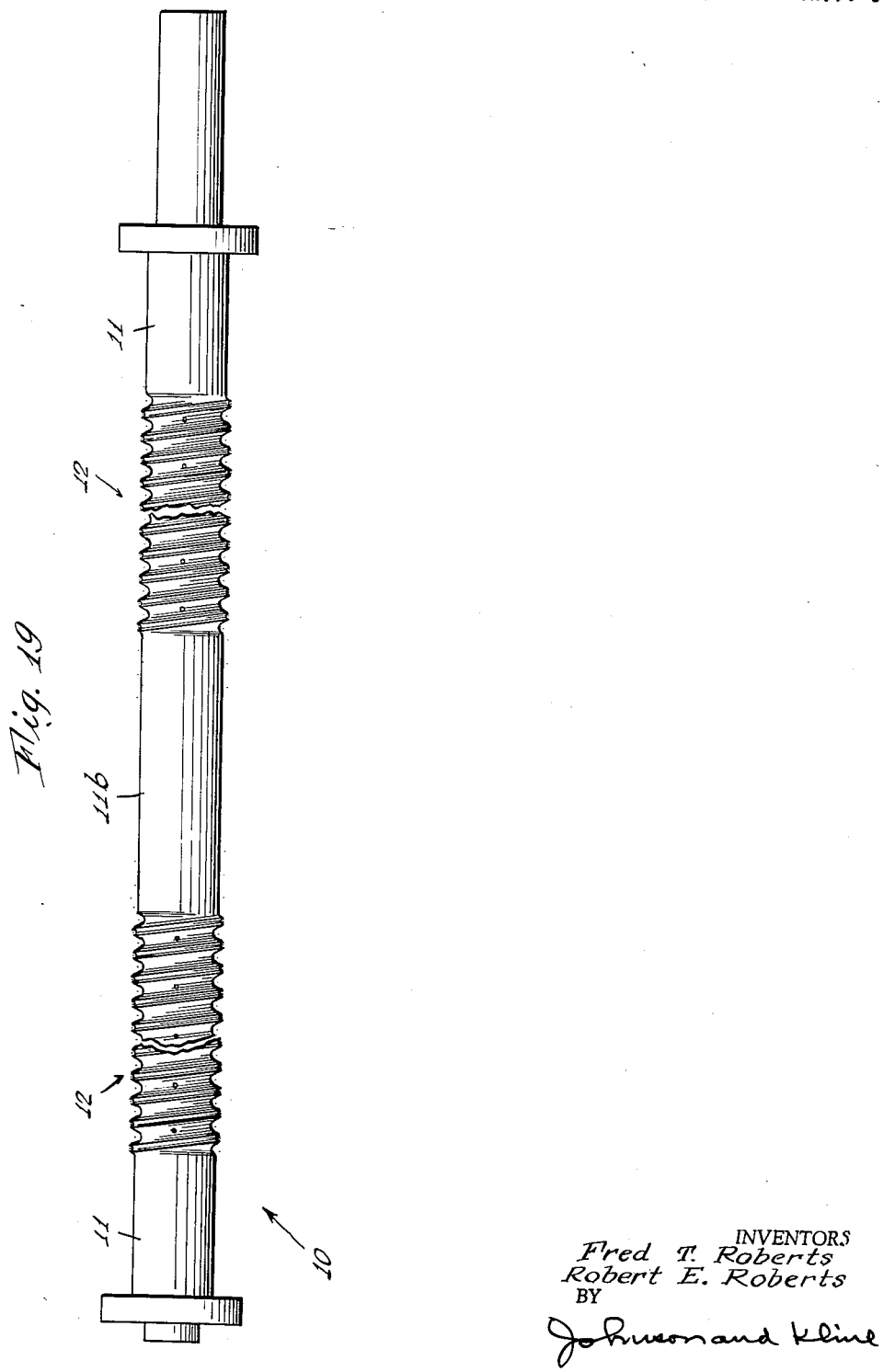
INVENTORS
*Fred T. Roberts*
*Robert E. Roberts*
BY
*Johnson and Kline*
ATTORNEYS

United States Patent Office 3,021,245
Patented Feb. 13, 1962

3,021,245
METHOD OF MAKING A REINFORCED
CORRUGATED HOSE
Fred T. Roberts and Robert E. Roberts, both of
Danbury Road, Wilton, Conn.
Filed June 29, 1956, Ser. No. 594,781
14 Claims. (Cl. 156—144)

This invention relates to a method and apparatus for making reenforced corrugated hose.

It is an object of the present invention to make a corrugated reenforced hose having inner or outer molded surfaces in a simple but accurate manner.

This is accomplished by novel methods employing a novel corrugated mandrel having thereon means for accurately locating the reenforcement means. If a hose having an outer molded surface is required, a mold having a cavity provided with corrugated walls is employed.

In accordance with the present invention the mandrel which may be of a length to form a single or a plurality of hose units is provided with cylindrical portions which are adapted to form the connector portion for the hose and the surface of the mandrel between the cylindrical portions is formed with a plurality of annular or helical corrugations. The cylindrical portions are provided with reenforcement positioning means and if desired the crests of the corrugations can be provided with seating means such as a shallow recess or seat to receive and properly locate the coils of the reenforcement means. The reenforcement means can be in the form of a helical spring or annular coils having their ends unattached, but in overlapped relation to provide for limited expansion to enable the hose to be removed from the mandrel. The reenforcement means can be bare or can be covered with an elastomeric material and can be positioned directly on the seats of the mandrel. When bare wire is used, a tape can be provided over the crests of the corrugations of the mandrel and the bare wire inserted on the seat or recesses overlying the tape. The mandrel is provided with a bore and passages extending to the troughs of the corrugations so that when the material forming the body of the hose is applied over the mandrel and suction applied to the bore, the materal will be drawn down into engagement with the surface of the mandrel and reenforcement and then is molded on the mandrel in a steam vulcanizer or in a mold as required. After the hose has been molded, fluid pressure is applied to the bore in the mandrel to expand the hose so that it can be removed.

If desired, the mandrel can be covered with the material of the body of the hose which can be drawn into engagement with the mandrel and the reenforcement means positioned over the crests of the corrugations and pressed into position therein so that the reenforcement is located on the exterior of the hose. If bare wire is used in this method it may be desired to provide a tape of elastomeric material over the impressed reenforcements prior to completing the molding operation. The hose is then molded in the cavity of a mold to form the reenforced corrugated hose and then removed from the mandrel.

If desired suitable bushings can be secured within the connecting portions of the hose.

Other features and advantages of the invention will be apparent from the specification and claims when considered in connection with the drawings in which:

FIG. 6 is a view similar to FIG. 5 showing a bare wire reenforcement with the tape disposed between the recess and the reenforcement and secured to the body.

FIG. 7 shows the corrugated portion of a mandrel having annular corrugations thereon.

FIG. 8 shows a mandrel with the body drawn into contact with the surface of the mandrel when said mandrel is first inserted in a mold cavity having corrugated walls.

FIG. 9 is a fragmentary view showing a mold with pressure applied to the mandrel forcing the body into engagement with the wall cavity to mold the outer surface.

FIG. 10 shows the end portion of the hose with a bushing inserted therein and secured thereto.

FIG. 11 shows an annular reenforcement.

FIG. 12 is a fragmentary view similar to FIG. 4 with the reenforcement disposed on the outer surface of the body.

FIG. 13 shows the assembly of FIG. 12 after molding.

FIG. 14 is a view similar to FIG. 12 employing a bare wire with the tape thereover prior to insertion in a mold.

FIG. 15 shows the assembly of FIG. 14 after molding.

FIG. 16 shows a fragmentary view of a mandrel showing another form of reenforcement seating means.

FIG. 17 is a view similar to FIG. 16 showing a still further form of seating means.

FIG. 18 shows another form of mandrel with the coils of the reenforcement suspended above the crest.

FIG. 19 shows a mandrel for forming a plurality of hose sections.

Figure 1:
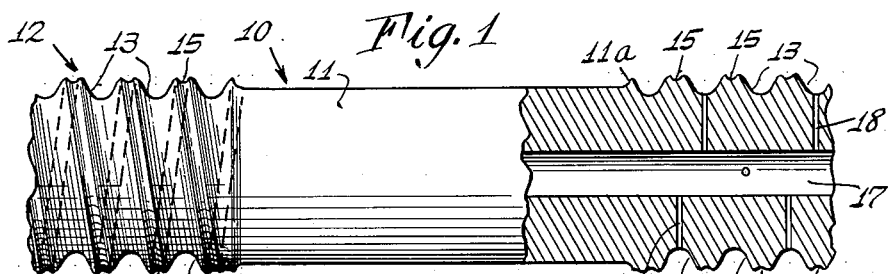
FIGURE 1 shows a fragmentary view of the mandrel showing the helical corrugation thereon.

In accordance with the present invention a reenforced corrugated hose may be made of elastomeric material (such as rubber—natural or synthetic—or thermoplastic resins which may be molded under heat and pressure, for example, polyethylene, polyamides, vinyl polymers, copolymers and the like). For purpose of illustration, the body is shown as made of rubber; however, the particular requirement of the hose determines the composition thereof. The hose may have the inner surface and/or the outer surface molded and provided with annular or helical corrugations and with helical or annular reenforcing means which may be inserted on the interior or exterior of the crests of the corrugations of the body.

All of these variations can be made by the present novel method employing a novel mandrel construction. As shown in FIG. 8, an elongate mandrel 10 may be provided with cylindrical portions 11 at the ends adapted to form the attaching ends C for the hose and between the cylindrical portions there is formed a corrugated surface 12. If the mandrel is to be used to form a plurality of hose sections the space between the end portions 11 is provided with a plurality of corrugated sections separated by cylindrical portions 11b as shown in FIG. 19 to form the end portions of adjacent hose when the hose is severed therethrough.

The cylindrical portions may be provided with lips 11a adjacent the corrugations to locate and anchor the ends of the reenforcement means.

In the mandrel shown in FIG. 1 the corrugations are formed by a helical groove 13 extending longitudinally of the mandrel to form helical corrugations. As shown in FIG. 7, the corrugations are formed by a plurality of annular grooves 14 located along the mandrel in predetermined relation to provide the corrugated surface 12 with annular corrugations.

Figure 2:
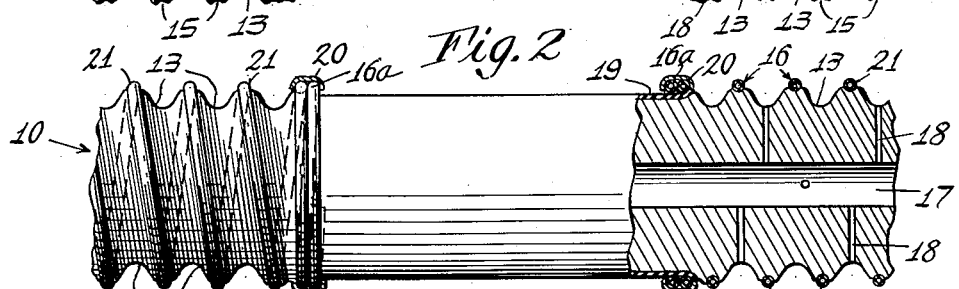
FIG. 2 is a view similar to FIG. 1 showing a rubber sleeve placed on the cylindrical portion with the helical reenforcement in place and the ends anchored to the cylindrical portion.
Figure 3:
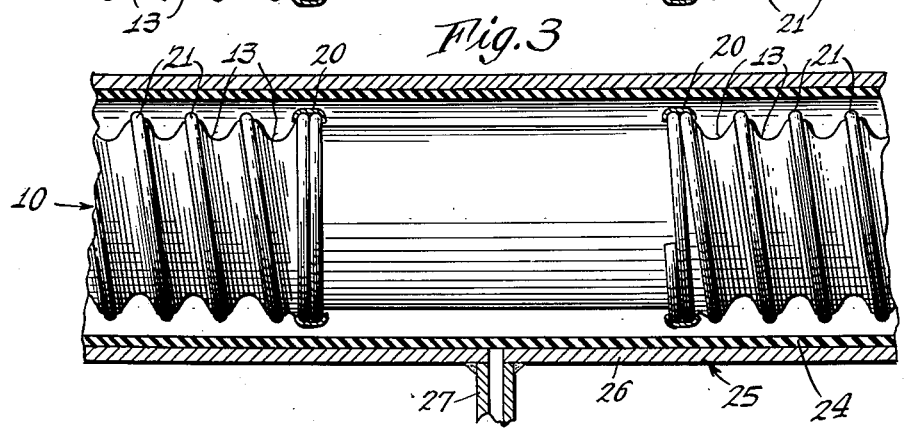
FIG. 3 is a view showing the body in expanded relation and the mandrel in position to receive the body thereon.

In accordance with the present invention the crests of the corrugations are provided with means for positioning the reenforcement. This may be a shallow recess 15 which is adapted to receive and position a reenforcement 16 for the hose, a shouldered flat surface 15a as shown in FIG. 16 in which the shoulder aids in locating the coils when the helical member is moved from right to left when it is inserted over the mandrel and which provides for a simple stripping of the finished hose when the hose is withdrawn from the right-hand-end of the mandrel, or a plain flat surface 15b as shown in FIG. 17. The mandrel is provided with a bore 17 therethrough and passages 18 extend from the bore to the troughs of the grooves in the corrugated surface, as shown in FIG. 1. In forming a hose on this mandrel the cylindrical portion 11 can be left bare or a cylindrical sleeve of rubber 19 can be provided over the cylindrical portion, as shown in FIG. 2, and a tape 20 wound over the end coils 16a of the reenforcement means which are located by the lip 11a. Where a bare cylindrical portion is used, the end coils on the reenforcement means are taped by narrow tape 20 directly to the cylindrical portion as shown in FIG. 3.

The reenforcement means is preferably of spring wire and can be in the form of a preformed helical coil 21, as shown in FIG. 2 or a plurality of annular coils 22, as shown in FIG. 11 having the end portions 22a in unconnected, overlapped relation. This provides for sufficient expansion of the hose to permit removal from the mandrel. The reenforcements may be employed in bare condition or they can be provided with a cover 23 of elastomeric material by any suitable means such as by dipping, spraying or covering of sheet material.

Figure 4:
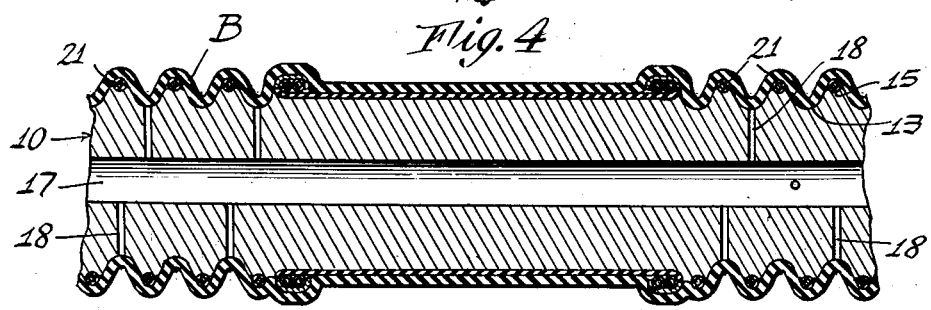
FIG. 4 shows the elastic body sucked down into contact with the mandrel ready to be molded and vulcanized on the mandrel.
Figure 5:
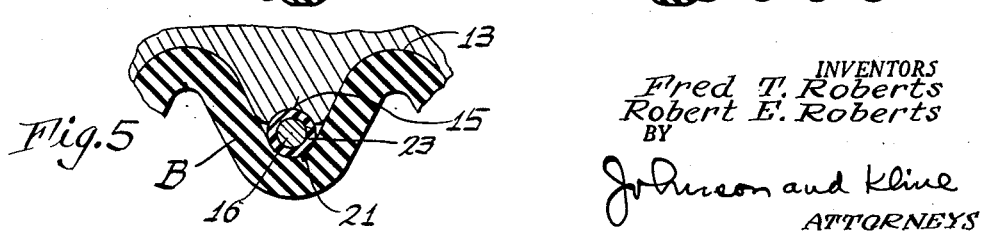
FIG. 5 is an enlarged view of the crests showing the body and the reenforcement.

In carrying out the invention, the coils of the covered reenforcement means are positioned in the seats, for example the shallow recesses 15, in the crests of the corrugations of the mandrel so as to project beyond the surface of the mandrel. The mandrel and assembled reenforcement means is then covered with a layer of body-forming material to form the body B of the hose. While this may be accomplished by wrapping or the like, it is at present preferred to insert the mandrel and assembled reenforcement means into a radially expanded extruded tube or sleeve 24 of body material as shown in FIG. 3. The body may be reenforced with stockinet or other stretchable fabric when a thin wall is required; however, it is herein illustrated as a relatively thick body of rubber. The body is radially expanded in an expander device 25, such as shown in Patent No. 2,560,369, which comprises a cylindrical housing 26 having a nipple 27 thereon which is adapted to be connected to a suction producing device so that when suction is applied to the housing containing the tube or sleeve 24 of rubber it causes the sleeve to be expanded radially against the inner wall of the housing 26 as shown in FIG. 3. After the mandrel is put in position the suction is removed from the nipple 27 and the sleeve elastically contracts into engagement with the surface of the mandrel and overlies the reenforcement means, as shown in FIG. 4.

When the hose is only required to have a molded interior surface, the ends of the body are taped or clamped as shown at 28 in FIG. 8 to the cylindrical portion and suction is applied to the bore 17 of the mandrel causing the body to be drawn into firm engagement with the reenforcement means and corrugated surface of the mandrel. The assembly is then put in a steam vulcanizer (not shown) having an excess of external pressure, i.e. pressure up to 90 p.s.i., which applies pressure to the body to mold it, in conjunction with the suction, to conform to the surface of the mandrel. After the hose has been molded and completely vulcanized or cured and set, it can be removed from the mandrel by providing fluid pressure to the bore 17 and expanding the hose to permit the mandrel to be removed.

If the mandrel of FIG. 18 is used, the ends of the covered helical reenforcement are positioned by the lip 11a and secured by tape 20 with the reenforcement stretched or extended so that the coils are suspended to overlie the crests of the corrugations and when the radially expanded sleeve is released, its contraction will hold the coils against the crests to properly locate them. If the reenforcement is of such a character or the layer of body material is applied in a manner which would cause lateral displacement of the reenforcement with respect to the crests of the corrugations they may be anchored in position by tape or other suitable means. After the layer of body material is in position, the assembly is heated and suction applied to the mandrel causing the body material to mold on the surface of the mandrel at which time the spring will assume a position intermediate the thickness of the wall as the hose is molded and cured.

Should it be desired to provide an outer molded surface for the hose, the assembly on the mandrel is inserted into a mold 29 having a cavity therein provided with a corrugated wall 31 corresponding to that of the corrugations on the mandrel. As shown in FIG. 8, the ribs 32 forming the corrugations on the cavity wall do not extend into the troughs to engage the troughs of the corrugations of the body on the mandrel but do engage the crests of the hose with molding pressure. Suction is removed from the mandrel and fluid pressure is applied to the bore of the mandrel to cause the hose to be forced against the surface of the walls of the cavity, as shown in FIG. 9, to mold the outer surface. The hose is completely cured or set in the mold or partially cured to set the shape, removed from the mold and completely cured. Thus a hose having a molded outer surface is provided.

In the event that it is desired to use bare wire reenforcements, it is possible to provide sufficient rubber in the body to flow around the reenforcements. However, it is at present preferred to wind a tape 33 of elastomeric material, as shown in FIG. 6, so as to overlie the seats or recesses in the crests of the mandrel and to place the bare reenforcement thereon prior to the body being contracted into position. When the body is molded, this will insure a completely protected reenforcement.

Under some circumstances, it may be desired to provide the reenforcements in the outer surface of the hose. This is accomplished by applying the body B directly to the mandrel 10 and then inserting the covered reenforcements 16 in position so as to overlie the seats or recesses 15 on the mandrel. If necessary a rolling pressure can be applied to the reenforcement to force it to seat on the crest of the corrugations as shown in FIG. 12. The hose is then molded in the mold against the corrugated surface 31 formed by ribs 32 as shown in FIG. 13. If bare wire reenforcements are employed, it is at present preferred to position them on the body B and press them into the recesses, as shown in FIG. 14, and cover them with a tape 34 and then mold them in a mold against the corrugated surface 31 formed by ribs 32 in the manner as shown in FIG. 15, thus providing an enclosed reenforcement adjacent the outer surface of the crests.

After the hose have been molded and removed from the mandrel, they can be provided with any suitable bushing or reenforcing means in the end portions. In this connection, attention is drawn to FIG. 10 wherein a bushing 35, preferably provided with annular reenforcing means 36, is inserted in semicured state into the end portion C of the hose and the assembly cured to completely bond the bushing to the body. If desired, the bushing may have a conical portion 35a at the inner end which is adapted to grip and provide a further seal to the connector, not shown, to which the hose is connected.

Through the use of the foregoing methods and apparatus a reenforced corrugated hose can be made of elastomeric material which hose can be provided with helical or annular corrugations and can have bare or covered reenforcement means molded in the crests of the corruga-

We claim:

1. The method of making reenforced corrugated hose having a molded inner surface and the reenforcements accurately located with respect to the corrugations, comprising the steps of positioning resilient reenforcing means on a corrugated mandrel with coils of the reenforcing means positioned and held on the crests of the corrugations of the mandrel, said mandrel being hollow and having passages extending to the corrugated surface thereof, covering the corrugated mandrel with the coils of the reenforcement means positioned on the crests thereof with a layer of elastomeric material to form the body of the hose and securing the layer in an airtight manner to the mandrel beyond the corrugated portion thereof, applying suction to the mandrel to draw the elastomeric layer into surface contact with the mandrel and reenforcement means to mold the inner surface of the hose, and surrounding the mandrel with heated fluid under pressure to cure the body and cause the reenforcement means to become permanently attached to the inner wall of the body in the crests of the corrugations thereof.

2. The method of making a reenforced corrugated hose having a molded inner surface and the reenforcements accurately located with respect to the corrugations, comprising the steps of positioning a helical wire reenforcement means on a helically corrugated mandrel with the coils of the reenforcement means seated in positioning means formed in the crests of the corrugations on the mandrel with portions of the reenforcement means extending beyond the surface of the mandrel, said mandrel being hollow and having passages extending to the corrugated surface thereof; applying a layer of body forming elastomeric material over the mandrel to elastically embrace the corrugated mandrel and reenforcement means thereon; applying suction to the mandrel to draw the elastomeric layer into surface contact with the mandrel and reenforcement means to mold the inner surface thereof; inserting the mandrel and hose body thereon into a cavity of a mold, the walls of the cavity having complementary helical corrugations with respect to the hose, with the trough of the mold corrugations engaging the crest of the hose body with molding pressure; applying fluid pressure to the mandrel to cause the hose body to be pressed against the walls of the cavity with a molding pressure; and heating the hose body to completely set the hose to provide smooth molded surfaces thereon.

3. The method of making a reenforced corrugated hose having a molded inner surface and the reenforcements accurately located with respect to the corrugations, comprising the steps of positioning a plurality of annular reenforcing wires on an annularly corrugated mandrel with the annular coils of the reenforcing wires seated in positioning means formed in the crests of the corrugations on the mandrel with portions of the reenforcing wires extending beyond the surface of the mandrel, said mandrel being hollow and having passages extending to the corrugated surface thereof; applying a layer of body forming elastomeric material over the mandrel to elastically embrace the corrugated mandrel and reenforcing wires thereon; applying suction to the mandrel to draw the elastomeric layer into surface contact with the mandrel and reenforcing wires to mold the inner surface thereof; inserting the mandrel and hose body thereon into a cavity of a mold, the walls of the cavity having complementary annular corrugations with respect to the hose, with the trough of the mold corrugations engaging the crest of the hose body with molding pressure; applying fluid pressure to the mandrel to cause the hose body to be pressed against the walls of the cavity with a molding pressure; and heating the hose body to completely set the hose to provide a smooth molded inner and outer surface thereon.

4. The method of making a corrugated hose having a molded inner surface and the reenforcements accurately located with respect to the corrugations, comprising positioning metallic reenforcement means on a corrugated mandrel with the coils of the reenforcement means seated in shallow recesses formed in the crests of the corrugations on the mandrel with portions of the reenforcement means extending beyond the surface of the mandrel, said mandrel being hollow and having passages extending to the corrugated surface thereof; applying a layer of elastomeric material over the mandrel and reenforcement means; inserting the covered mandrel into a cavity of a mold, the walls of the cavity having complementary corrugations with respect to the hose, with the trough of the mold corrugations engaging the crest of the hose body with molding pressure, and the crests of the corrugations of the walls of the mold cavity being slightly spaced from the trough of the hose body; applying fluid pressure to the mandrel to cause the hose body to be pressed against the walls of the cavity with a molding pressure to completely mold and set the hose to provide a smooth molded outer surface thereon, and removing the molded hose from the mandrel.

5. The method of making a reenforced corrugated hose having a molded inner surface and the reenforcements accurately located with respect to the corrugations, comprising the steps of applying a tape of elastomeric material to overlie reenforcement positioning means formed on the crests of the corrugations of a corrugated mandrel; positioning a bare wire reenforcement means on said tape in said positioning means to properly locate the reenforcement means on the mandrel with portions of the reenforcement means extending beyond the surface of the mandrel; covering said mandrel with a layer of elastomeric material; pressing the layer into engagement with the corrugated surface of the mandrel, the reenforcement means and the tape to mold the reenforced hose on the mandrel; curing the hose; and removing the hose from the mandrel.

6. The method of making a reenforced corrugated hose having a molded inner surface and the reenforcements accurately located with respect to the corrugations, comprising the steps of positioning metallic coiled reenforcement means on a corrugated mandrel with the coils of the reenforcement means seated in shallow recesses formed in the crests of the corrugations on the mandrel with portions of the reenforcement means extending beyond the surface of the mandrel; radially expanding and stretching a tube of elastomeric material; inserting the mandrel into the stretched tube; releasing the expanding means holding the stretched tube and permitting the tube to contract and elastically embrace the corrugated mandrel and reenforcement means thereon, and pressing the elastomeric tube into surface contact with the mandrel and reenforcement means to mold the inner surface thereof and secure the reenforcement therein; and curing the tube to set the inner molded surface.

7. The method of making a reenforced corrugated hose having a molded inner surface and the reenforcements accurately located with respect to the corrugations, comprising positioning a moldable body on a corrugated mandrel having seating means formed in the crests of the corrugations; positioning reenforcement means over the crests of the corrugations; pressing the reenforcement means onto said seating means; inserting the mandrel and hose into the corrugated cavity of a mold, the walls of the cavity having complementary corrugations with respect to the mandrel; applying fluid pressure to the mandrel to cause the hose body to be pressed against the reenforcement means and the walls of the cavity with a molding pressure; and heating the hose body to completely set the hose to provide a molded outer surface thereon.

8. The method of making a reenforced corrugated hose having a molded inner surface and the reenforcements accurately located with respect to the corrugations, comprising positioning a moldable body on a corrugated mandrel having seating means formed in the crests of the corrugations; positioning bare wire reenforcement means over the crests of the corrugations; pressing the reenforcement means onto said seating means; positioning a tape of body material over the crest and reenforcement means positioned thereon; inserting the mandrel into the corrugated cavity of a mold, the walls of the cavity having complementary corrugations with respect to the mandrel; applying fluid pressure to the mandrel to cause the hose body to be pressed against the reenforcement means, tape and the walls of the cavity with a molding pressure to form a unitary hose construction; and heating the hose body to completely set the hose to provide a molded outer surface thereon.

9. The method of making a reenforced corrugated hose having a molded inner surface and the reenforcements accurately located with respect to the corrugations, comprising positioning a moldable body on a corrugated mandrel having shallow recesses formed in the crests of the corrugations, said mandrel being hollow and having passages extending to the corrugated surface thereof; applying suction to the mandrel to draw the moldable body into surface contact with the mandrel to mold the inner surface thereof; positioning reenforcement means over the crests of the corrugations; pressing the reenforcement means into said recesses; inserting the mandrel and hose thereon into a corrugated cavity of a mold, the walls of the cavity having complementary corrugations with respect to the mandrel; applying fluid pressure to the mandrel to cause the hose body to be pressed against the reenforcement means and the walls of the cavity with a molding pressure; and heating the hose body to completely set the hose to provide a smooth molded inner and outer surface thereon.

10. An elongate mandrel for making a reenforced, corrugated hose unit comprising a substantially rigid, unitary body having a corrugated surface with the crests of the corrugations having a shallow recess forming seating means thereon for receiving and locating the reenforcement means for the hose and having an elongated cylindrical portion at each end of said corrugated surface for forming connector end portions for the hose unit.

11. An elongate mandrel for making a reenforced, corrugated hose comprising a substantially rigid, unitary body having a corrugated surface with the crests of the corrugations having recessed seating means thereon for receiving and locating therein reenforcement means for the hose, said body having a bore therein and passages extending from the bore to the troughs of said corrugations.

12. An elongate mandrel for making a plurality of reenforced, corrugated hose units comprising a unitary body having elongated cylindrical portions spaced therealong adapted to form the connector end portions for the hose units, said cylindrical portions being connected by a corrugated surface with the crests of the corrugations having seating means to receive and locate therein reenforcement means for the hose.

13. An elongate mandrel for making a reenforced, corrugated hose unit comprising a substantially rigid, unitary body having a helical groove therein forming a corrugated surface with the crests of the corrugations having a shallow recess adapted to receive and locate therein reenforcement means for the hose and having an elongated cylindrical portion at each end of said corrugated surface for forming connector end portions for the hose unit, said cylindrical end portion having a lip thereon adapted to receive and anchor the reenforcement.

14. An elongate mandrel for making a reenforced corrugated hose comprising a substantially rigid, unitary body having a plurality of annular grooves therein forming a corrugated surface with the crests of the corrugations having a shallow recess adapted to receive and locate therein reenforcement means for the hose.

References Cited in the file of this patent

UNITED STATES PATENTS

| | | |
|---|---|---|
| 1,361,001 | Blaisdell | Dec. 7, 1920 |
| 2,176,762 | Forbes | Oct. 17, 1939 |
| 2,273,027 | Dreyer | Feb. 17, 1942 |
| 2,780,273 | Roberts | Feb. 5, 1957 |
| 2,813,573 | Roberts | Nov. 19, 1957 |

FOREIGN PATENTS

| | | |
|---|---|---|
| 323,453 | Italy | Dec. 21, 1934 |
| 651,097 | Great Britain | Mar. 14, 1951 |
| 237,823 | Switzerland | Sept. 1, 1945 |